(12) United States Patent
Underwood et al.

(10) Patent No.: US 11,665,113 B2
(45) Date of Patent: May 30, 2023

(54) SYSTEM AND METHOD FOR FACILITATING DYNAMIC TRIGGERED OPERATION MANAGEMENT IN A NETWORK INTERFACE CONTROLLER (NIC)

(71) Applicant: Hewlett Packard Enterprise Development LP, Houston, TX (US)

(72) Inventors: Keith D. Underwood, Powell, TN (US); Duncan Roweth, Bristol (GB); Robert L. Alverson, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 6 days.

(21) Appl. No.: 17/387,334

(22) Filed: Jul. 28, 2021

(65) Prior Publication Data

US 2023/0036404 A1 Feb. 2, 2023

(51) Int. Cl.
*H04L 12/28* (2006.01)
*H04L 49/901* (2022.01)
*H04L 47/62* (2022.01)
*H04L 47/625* (2022.01)

(52) U.S. Cl.
CPC .......... *H04L 49/901* (2013.01); *H04L 47/622* (2013.01); *H04L 47/625* (2013.01)

(58) Field of Classification Search
CPC .... H04L 49/901; H04L 47/901; H04L 47/625
See application file for complete search history.

(56) References Cited

U.S. PATENT DOCUMENTS

| | | | |
|---|---|---|---|
| 8,249,072 B2* | 8/2012 | Sugumar | G06F 15/17337 370/392 |
| 9,742,855 B2* | 8/2017 | Shuler | H04L 49/9068 |
| 2011/0110383 A1* | 5/2011 | Yang | H04L 49/901 370/463 |
| 2012/0213118 A1* | 8/2012 | Lindsay | H04L 12/12 370/254 |
| 2013/0103777 A1* | 4/2013 | Kagan | H04L 49/901 709/212 |
| 2014/0095753 A1* | 4/2014 | Crupnicoff | G06F 13/4022 710/308 |
| 2014/0269754 A1* | 9/2014 | Eguchi | G06F 13/4022 370/419 |
| 2018/0219804 A1* | 8/2018 | Graham | H04L 49/901 |
| 2018/0314658 A1* | 11/2018 | Iyer | G06F 13/4282 |
| 2019/0044795 A1* | 2/2019 | Boom | H04L 41/0681 |

(Continued)

*Primary Examiner* — Abdelnabi O Musa
(74) *Attorney, Agent, or Firm* — Park, Vaughan, Fleming & Dowler LLP (57) ABSTRACT

A system for facilitating efficient command management in a network interface controller (NIC) is provided. During operation, the system can determine, at the NIC, a trigger condition and a location in a command queue for a set of commands corresponding to the trigger condition. The command queue can be external to the NIC. The location can correspond to an end of the set of commands in the command queue. The system can then determine, at the NIC, whether the trigger condition has been satisfied. If the trigger condition is satisfied, the system can fetch a respective command of the set of commands from the command queue and issuing the command from the NIC until the location is reached, thereby bypassing locally storing the set of commands prior to the trigger condition being satisfied.

20 Claims, 10 Drawing Sheets

(56) References Cited

U.S. PATENT DOCUMENTS

| | | | |
|---|---|---|---|
| 2019/0044875 A1* | 2/2019 | Murty | H04L 45/24 |
| 2019/0332314 A1* | 10/2019 | Zhang | G06F 3/0656 |
| 2020/0034195 A1* | 1/2020 | LeBeane | G06F 9/5083 |
| 2021/0014177 A1* | 1/2021 | Kasichainula | H04L 47/6295 |
| 2022/0197845 A1* | 6/2022 | Roweth | H04L 47/30 |
| 2022/0206956 A1* | 6/2022 | Hodge | G06F 13/1642 |
| 2022/0214919 A1* | 7/2022 | Hewson | H04L 49/90 |
| 2022/0214934 A1* | 7/2022 | Gorodetsky | G06F 13/1642 |
| 2022/0231962 A1* | 7/2022 | Bataineh | H04L 49/9021 |
| 2022/0245072 A1* | 8/2022 | Roweth | G06F 13/1673 |
| 2022/0255884 A1* | 8/2022 | Kundu | H04L 49/9005 |

\* cited by examiner

SYSTEM AND METHOD FOR FACILITATING DYNAMIC TRIGGERED OPERATION MANAGEMENT IN A NETWORK INTERFACE CONTROLLER (NIC)

BACKGROUND

Field

The present disclosure relates to communication networks. More specifically, the present disclosure relates to a method and system for dynamic triggered operation management in a network interface controller (NIC).

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

A host device, such as an HPC node, can be equipped with one or more high-capacity NICs. Typically, such a NIC can be an Ethernet NIC that can provide low latency. Such a NIC can facilitate the data transmission to and from user-space buffers without intervention from the intervention of the operating system of the host device. For example, the NIC may provide both individual network atomic operations (e.g., a floating-point addition) and triggered operations. Triggered operations provide the ability for an application on the host device to set up network operations that can be asynchronously triggered by the completion of other network operations without the involvement of the application.

One aspect of the present technology can provide a system for facilitating efficient command management in a network interface controller (NIC). During operation, the system can determine, at the NIC, a trigger condition and a location in a command queue for a set of commands corresponding to the trigger condition. The command queue can be external to the NIC. The location can correspond to an end of the set of commands in the command queue. The system can then determine, at the NIC, whether the trigger condition has been satisfied. If the trigger condition is satisfied, the system can fetch a respective command of the set of commands from the command queue and issuing the command from the NIC until the location is reached, thereby bypassing locally storing the set of commands prior to the trigger condition being satisfied.

In a variation on this aspect, the system can obtain a triggered command indicating the trigger condition and the location in the command queue. The system can then generate, in a data structure, an entry comprising the trigger condition and the location.

In a further variation, the system can obtain the triggered command by determining the presence of the triggered command in a second command queue and retrieving the triggered command from the second command queue. The second command queue can also be external to the NIC.

In a variation on this aspect, the set of commands can include a plurality of subsets of commands. A respective subset of commands can be associated with a trigger sub-condition for the subset of commands and a location indicating an end of the subset of commands in the command queue. The system can then generate, in a data structure, an entry comprising the trigger sub-condition and the location for the subset of commands.

In a further variation, the entry for the subset of commands can also include a next-entry indicator indicating that a second entry for a second subset of commands is present in the data structure. The system can then issuing the subset of commands if the trigger sub-condition is satisfied. Subsequently, the system can determine whether a second trigger sub-condition for the second subset of commands has been satisfied.

In a further variation, the system can group the plurality of subsets of commands into a triggered operation group based on one or more bundling conditions. The system can then allocate an identifier to the triggered operation group, wherein a respective subset of commands is associated with the identifier.

In a variation on this aspect, the location can be a target write pointer value of the command queue. The system can then fetch the respective command from the command queue by updating a write pointer of the command queue with the target write pointer value and moving a read pointer of the command queue until reaching the write pointer.

In a further variation, the system can determine whether to rearm the set of commands based on a rearm counter. The system can then rearm the set of commands by resetting the read and write pointers and decrementing the rearm counter.

In a further variation, the system can rearm the set of commands further by deriving the trigger condition from a base condition (e.g., a base value).

In a variation on this aspect, the trigger condition can correspond to a threshold value. The system can then determine whether the trigger condition has been satisfied by determining whether a counter value has reached the threshold value.

The examples described herein solve the problem of efficiently managing triggered operations while avoiding local buffering in a NIC by (i) waiting for a trigger condition to satisfy a set of triggered operations; (ii) obtaining and issuing each of the set of triggered operations without storing them in an internal buffer of the NIC; and (iii) upon issuing the entire set, reusing the same trigger condition for already stored triggered operations in the command queue. Avoiding local buffering can allow the NIC to efficiently support a large number of triggered operations without requiring a large storage module in the NIC. To facilitate batch-processing, the flow of control is transferred to the NIC. Based on the batch-processing and reusing the trigger condition, the NIC can avoid the local storage of a large number of triggered operations and avoid resetting the trigger conditions.

Typically, the host device of the NIC can issue a command for a data operation (e.g., a "GET" or a "PUT" command of remote direct memory access (RDMA)) to the NIC. Consequently, the host device can transfer the command (e.g., a direct memory access (DMA) descriptor of the command) to the NIC. If the host device needs to transfer a large number of commands to the NIC, the application running on the host device may store the commands in a command queue of the host device. The host device may maintain the command queue in a command queue memory segment of the memory device of the host device. Upon storing a command, such as a triggered operation, the application may update a write pointer, which notifies the NIC regarding the insertion of the new triggered operation.

A triggered operation unit (TOU) of the NIC can then obtain the triggered operation from the command queue based on a read pointer, store the operation in an internal buffer of the TOU, and update the read pointer. The TOU can be equipped with a dedicated internal buffer for storing the full length of the command for a respective triggered operation. The TOU may store the triggered operation until a trigger condition is satisfied for the triggered operation. In some embodiments, the internal buffer can be implemented as a linked list on a memory device of the NIC. The linked list may also include trigger conditions for the triggered operations. Consequently, each element of the linked list may require 64 bytes to 128 bytes of storage.

When a triggered operation is issued by the NIC (i.e., the command for the triggered operation is issued), the triggered operation can be processed by a NIC of another host device. If the application needs to use the triggered operation again, the application may re-insert the triggered operation into the command queue. However, many operations (e.g., collective operations) may use the same pattern of operations repeatedly. Furthermore, the application may also repeatedly use the same pattern of operations. As a result, setting up the triggered operations that are subsequently repeated can lead to unnecessary overhead. Moreover, the application may require a large number of triggered operations. Consequently, storing such a large number of triggered operation in the NIC while waiting for the trigger condition to be satisfied can be inefficient To solve this problem, the NIC can support a triggered command that can include a trigger condition and a write pointer. The trigger condition can indicate when to issue a set of triggered operations, and a write pointer can indicate the end of the set of triggered operations in a command queue. The application can continue to place the triggered operations in the command queue for regular commands. Instead of updating the write pointer, the application may place the triggered command in a second command queue in the command queue segment. The triggered command can indicate the write pointer associated with the triggered operation, thereby shifting the flow of control to the TOU. The TOU of the NIC can retrieve the triggered command from the second command queue and store the information in the triggered command in a local triggered operations table. The information can include one or more of: the trigger condition, a write pointer, and an identifier of the command queue. In some embodiments, the table can be implemented as a linked list on the NIC, and a respective entry of the table can be an element of the list.

The TOU can monitor the trigger condition. The trigger condition can be a threshold value indicating the completion of other related operations. For example, if the triggered operations rely on data from n nodes, the threshold value can be n. Upon receiving data from each such node, a counter of the NIC can be incremented. The counter can be based on a non-negative integer. When the counter value reaches n, the TOU can determine that the trigger condition has been satisfied. When the trigger condition is satisfied, the TOU can allow the NIC to obtain each of the triggered operations (i.e., each corresponding command) and issue the obtained triggered operation without storing it in an internal buffer of the TOU. Issuing the triggered operation can include inserting the triggered operation in a packet and sending the packet to a corresponding remote node. The TOU can then increment the read pointer, obtain the next triggered operation, and issue the obtained triggered operation. The TOU can continue this process until the read pointer reaches the write pointer of the entry. In this way, the NIC can issue the triggered operations without needing to store them in the internal buffer.

Often a set of triggered operations can include a number of subsets, each with a corresponding threshold. The threshold for each such subset of triggered operations may or may not be the same. The application may bundle each such subset of triggered operations together based on one or more bundling conditions. Examples of the bundling conditions include, but are not limited to, explicit definition from a user (e.g., based on an application programming interface (API)) and the NIC automatically detecting that thresholds for sequential commands are the same. The set of triggered operations can be referred to as a triggered group (TG). The NIC can allocate an identifier for a respective TG. Each subset of the TG can be associated with the same TG identifier. The triggered operation table can then include the TG identifier.

Furthermore, if the application reuses the same set of triggered operations repeatedly, instead of reissuing the triggered operations, the application can indicate a number of times the triggered operations of a TG should be repeated. The TOU can maintain a mapping of a respective TG identifier and a counter indicating the number of times the triggered operations should be repeated in a base table. The base table may also be implemented as a linked list. When all triggered operations in the TG are issued, the TOU can check whether the counter has a non-zero positive value. If the counter has a non-zero positive value, the TOU can wait for the completion of the issuance of a respective triggered operation of the TG, decrement the counter, and rearm the triggered operations of the TG. The rearming includes resetting the read and write pointers to an initial value (e.g., a value of zero). In this way, the NIC can efficiently use the already stored triggered operations in the command queue, thereby allowing the application to avoid repeatedly reissuing the same set of triggered operations.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

The phrase "triggered operation" refers to the command issued by an application for the triggered operation. In this disclosure, the phrases "triggered operation" and "triggered operation command" are used interchangeably.

Figure 1:
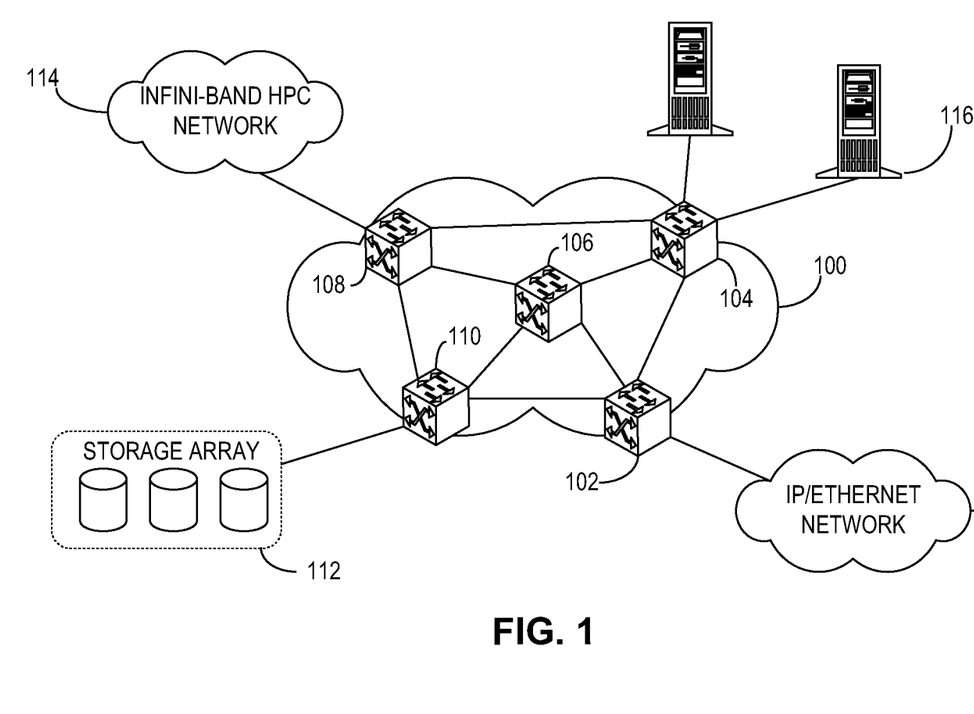
FIG. 1 illustrates an exemplary network, in accordance with an aspect of the present application.
Figure 2A:
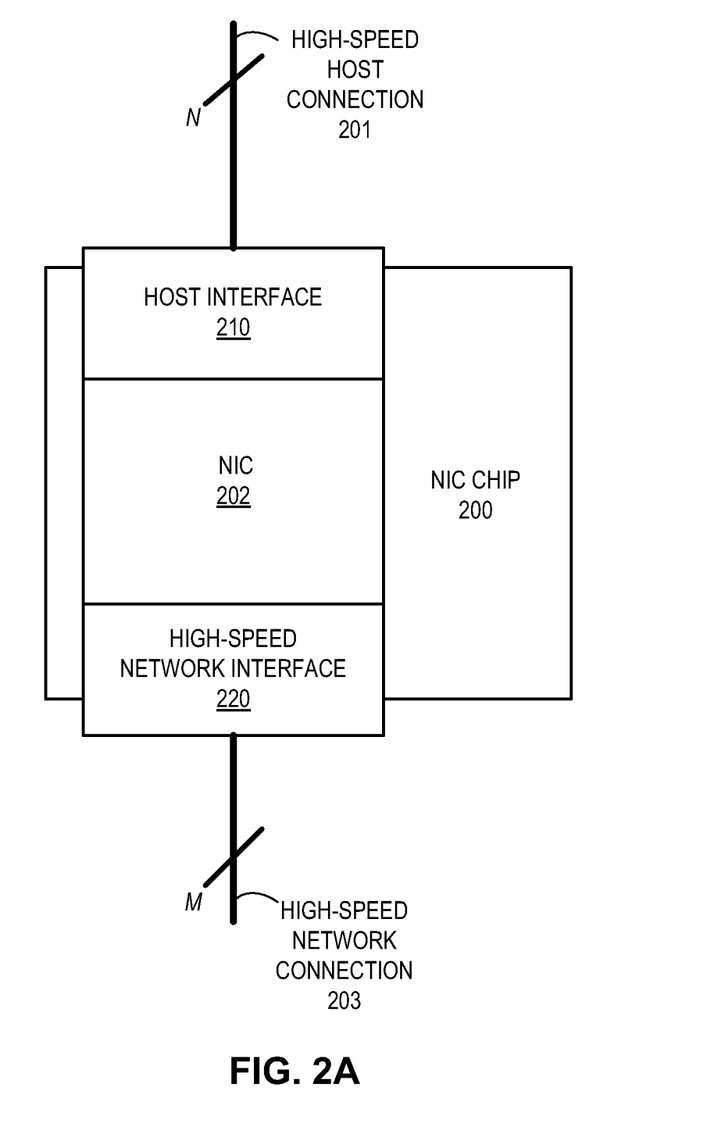
FIG. 2A illustrates an exemplary NIC chip, in accordance with an aspect of the present application.

In this disclosure, the description in conjunction with FIG. 1 is associated with the network architecture and the description in conjunction with FIG. 2A and onward provide more details on the architecture and operations associated with a NIC that supports efficient command management.

FIG. 1 illustrates an exemplary network, in accordance with an aspect of the present application. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

FIG. 2A illustrates an exemplary NIC chip, in accordance with an aspect of the present application. With reference to the example in FIG. 1, a NIC chip 200 can be a custom application-specific integrated circuit (ASIC) designed for host 116 to work with switch fabric 100. In this example, chip 200 can provide a NIC 202. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen4, PCIe Gen5, and PCIe Gen6 lanes capable of operating at signaling rates up to 16, 32, and 64 Gbps per lane, respectively. HNI 210 can facilitate a high-speed network connection 203, which can communicate with a link in switch fabric 100 of FIG. 1. HNI 210 can operate at aggregate rates of 100, 200, 400, or 800 Gbps using M (e.g., M can be 4 in some chips) full-duplex serial lanes. Each of the M lanes can operate at X Gbps or Y Gbps based on non-return-to-zero (NRZ) modulation or pulse amplitude modulation 4 (PAM4), respectively. For example, 400G Ethernet can use 100 Gbps PAM4 (i.e., Y=100). HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the software, thereby ensuring flexibility in NIC 202.

Furthermore, NIC 202 can facilitate triggered operations, a general-purpose mechanism for offloading, and the progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
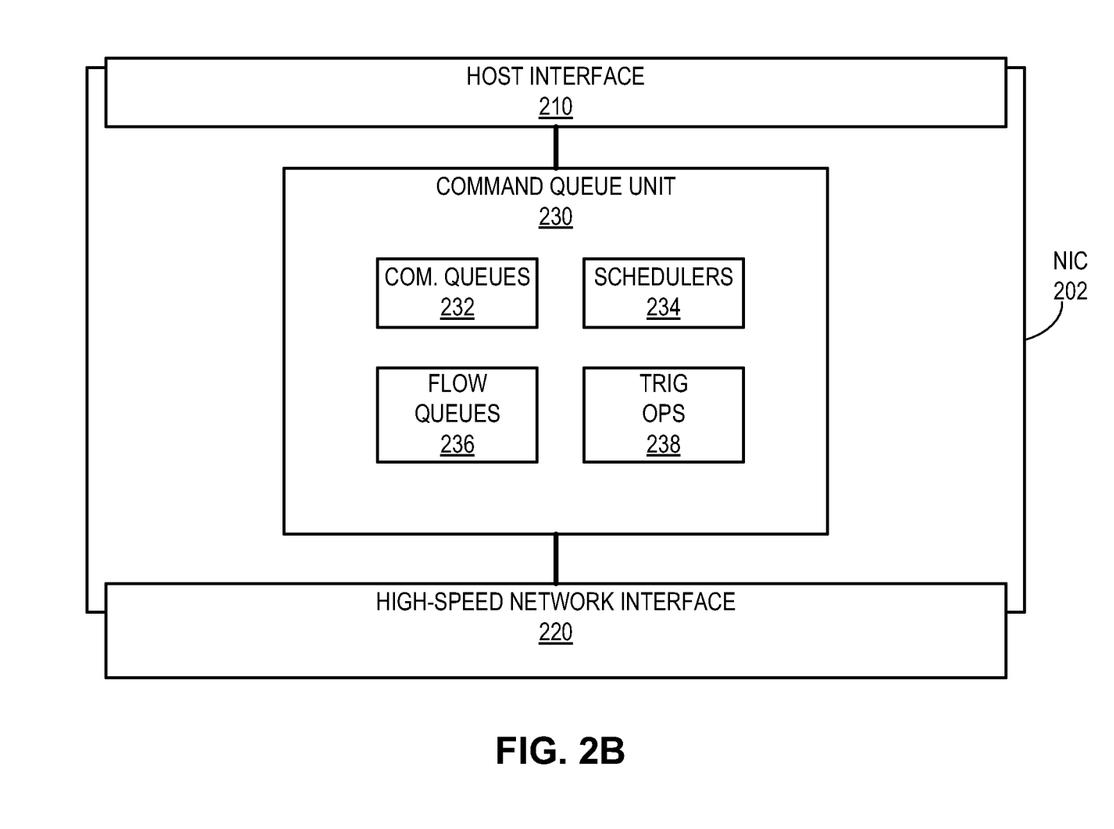
FIG. 2B illustrates an exemplary architecture of a NIC, in accordance with an aspect of the present application.

FIG. 2B illustrates an exemplary architecture of a NIC, in accordance with an aspect of the present application. In NIC 202, the port macro of HNI 220 can facilitate low-level Ethernet operations, such as physical coding sublayer (PCS) and media access control (MAC). In addition, NIC 202 can provide support for link-layer retry (LLR). NIC 202 can include a Command Queue (CQ) unit 230. CQ unit 230 can be responsible for fetching and issuing host-side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Figure 3A:
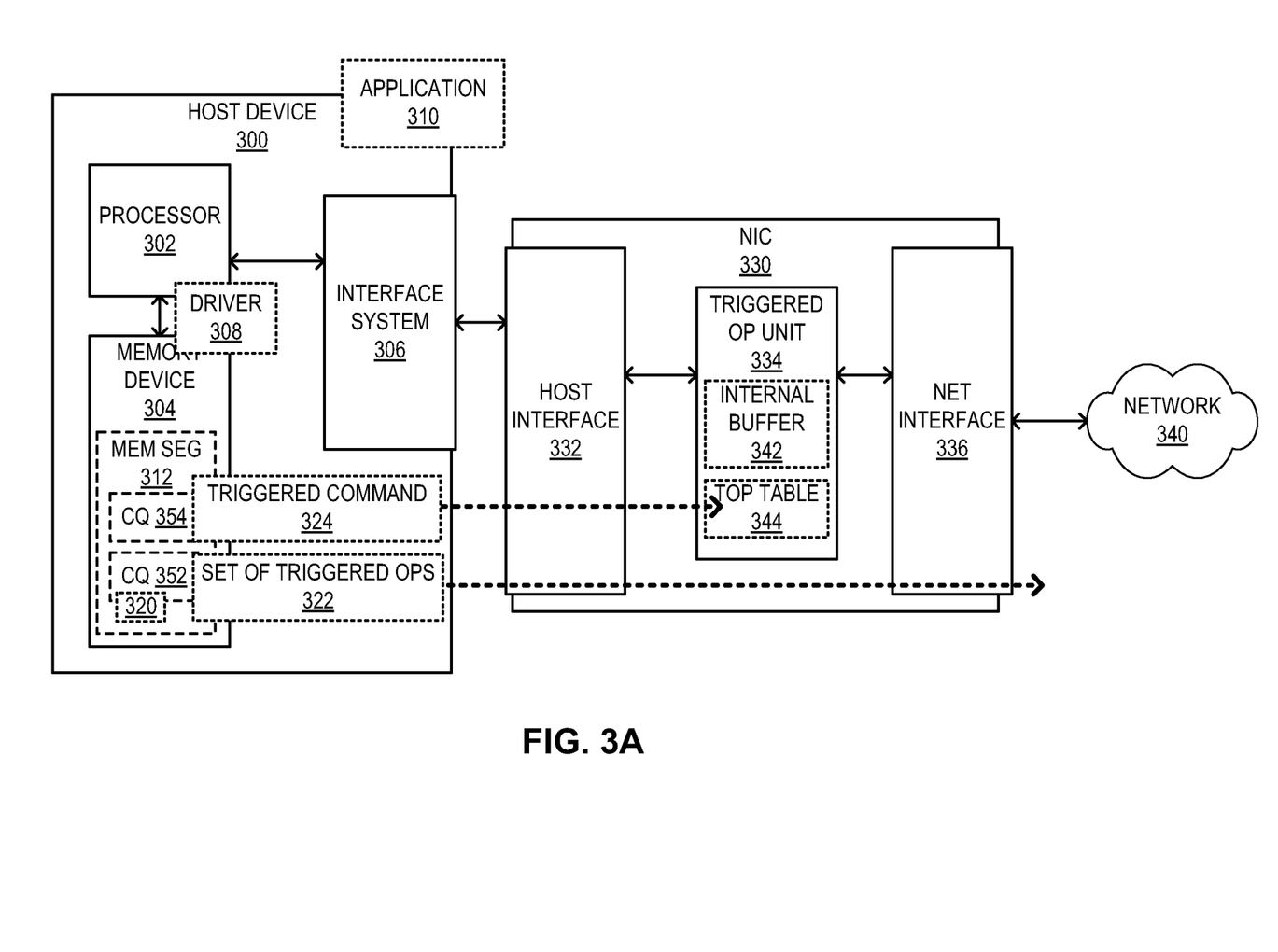
FIG. 3A illustrates an exemplary dynamic triggered operation management process in a NIC, in accordance with an aspect of the present application.

FIG. 3A illustrates an exemplary dynamic triggered operation management process in a NIC, in accordance with an aspect of the present application. In this example, a host device 300 can be equipped with a NIC 330. Device 300 can include a processor 302, a memory device 304, and an interface system 306. An HI 332 of NIC 330 can be coupled to interface system 306 of device 300. NIC 330 can be coupled to a network 340 via an HNI 336. In some embodiments, HI 332 can be a PCIe interface, and interface system 306 can be a PCIe system that provides a slot for HI 332. NIC 330 can also include a CQ unit 334 for managing incoming commands from device 300, as described in conjunction with FIG. 2A. During operation, device 300 can issue a command 320 for an operation (e.g., an RDMA operation). To transfer command 320, host 300 may generate a descriptor of command (e.g., a DMA descriptor) and transfer command 320 to NIC 330.

If command 320 is one of a large number of commands, device 300 can store command 320 in a CQ memory segment 312 in memory device 304. Segment 312 can store one or more CQs 352 and 354. Command 320 can be stored in CQ 352. When NIC 330 has available resources for the next command, NIC 330 can request a command from device 300. If command 320 is the next command, processor 302 can transfer command 320 to NIC 330 via HI 332. Here, NIC 330 can read commands from memory device 304 of host 300. In some embodiments, a device driver 308 of NIC 330 running on the operating system of host 300 may facilitate the communication between host device 300 and NIC 330.

When an application 310 running on device 300 issues a command, which can include a triggered operation, for NIC 330, the command can be stored in CQ 352 of segment 312. Device 300 can then notify NIC 330 regarding the command by advancing a write pointer of CQ 352. NIC 330 can then issue a read operation to CQ 352 via HI 332 and advance a pre-fetch pointer of CQ 352. A TOU 334 of NIC 330 can then obtain triggered operation from CQ 352 based on a read pointer, store the operation in an internal buffer 342 of TOU 334, and update the read pointer. Buffer 342 can be a dedicated buffer for storing the full length of a command for a respective triggered operation. TOU 334 may store the triggered operation in buffer 342 until a trigger condition is satisfied for the triggered operation. In some embodiments, buffer 334 can be implemented as a linked list on a memory device of NIC 330. The linked list may also include trigger conditions for the triggered operation. Consequently, each element of the linked list may require 64 bytes to 128 bytes of storage.

When a triggered operation is issued by NIC 330, the triggered operation can be processed by a NIC of another host device. Issuing the triggered operation can include inserting the triggered operation in a packet and sending the packet to a corresponding remote node via network 340. If application 310 needs to use the triggered operation again, application 310 may re-insert the triggered operation into CQ 352. However, many operations, such as collective operations, may use the same pattern of operations repeatedly. Furthermore, application 310 may also repeatedly use the same pattern of operations. As a result, setting up the triggered operations that are subsequently repeated can lead to unnecessary overhead. Moreover, application 310 may require a large number of triggered operations. Consequently, storing such a large number of triggered operations in buffer 342 while waiting for the trigger condition to be satisfied can be inefficient.

To solve this problem, application 310 can issue a set of triggered operation 322 and store them in CQ 352 without advancing the corresponding write pointer. Application 310 can also issue a triggered command 324 that can include a trigger condition and a write pointer. The trigger condition can indicate when to issue a set of triggered operations 322, and a write pointer can indicate the end of set of triggered operations 322 in CQ 352. Application 310 can store command 324 in CQ 354 and advance the write pointer of CQ 354. In response, NIC 330 can obtain command 324 from CQ 354 and advance the read pointer of CQ 354. TOU 334 can then store command 324 in a triggered operation (TO) table 344. In some embodiments, table 344 can be implemented as a linked list in the local memory device of NIC 330.

NIC 330 can efficiently manage set of triggered operations 322 while avoiding local buffering in buffer 342 by waiting for the trigger condition to satisfy. In response to satisfying the trigger condition, TOU 334 can obtain each of the set of triggered operations from CQ 352. NIC 330 can then issue the triggered operation without storing the triggered operation in buffer 342. TOU 334 can then advance the read pointer and obtain the next triggered operation of set of triggered operations 322. In other words, to facilitate batch-processing, the flow of control is transferred to NIC 330 from application 310. Upon issuing the entire set, TOU 334 can reuse the same trigger condition from table 344 for set of triggered operations 322 already stored in CQ 352. Based on the batch-processing and reusing the trigger condition, NIC 330 can avoid the local storage of a large number of triggered operations and avoid resetting the trigger conditions.

Figure 3B:
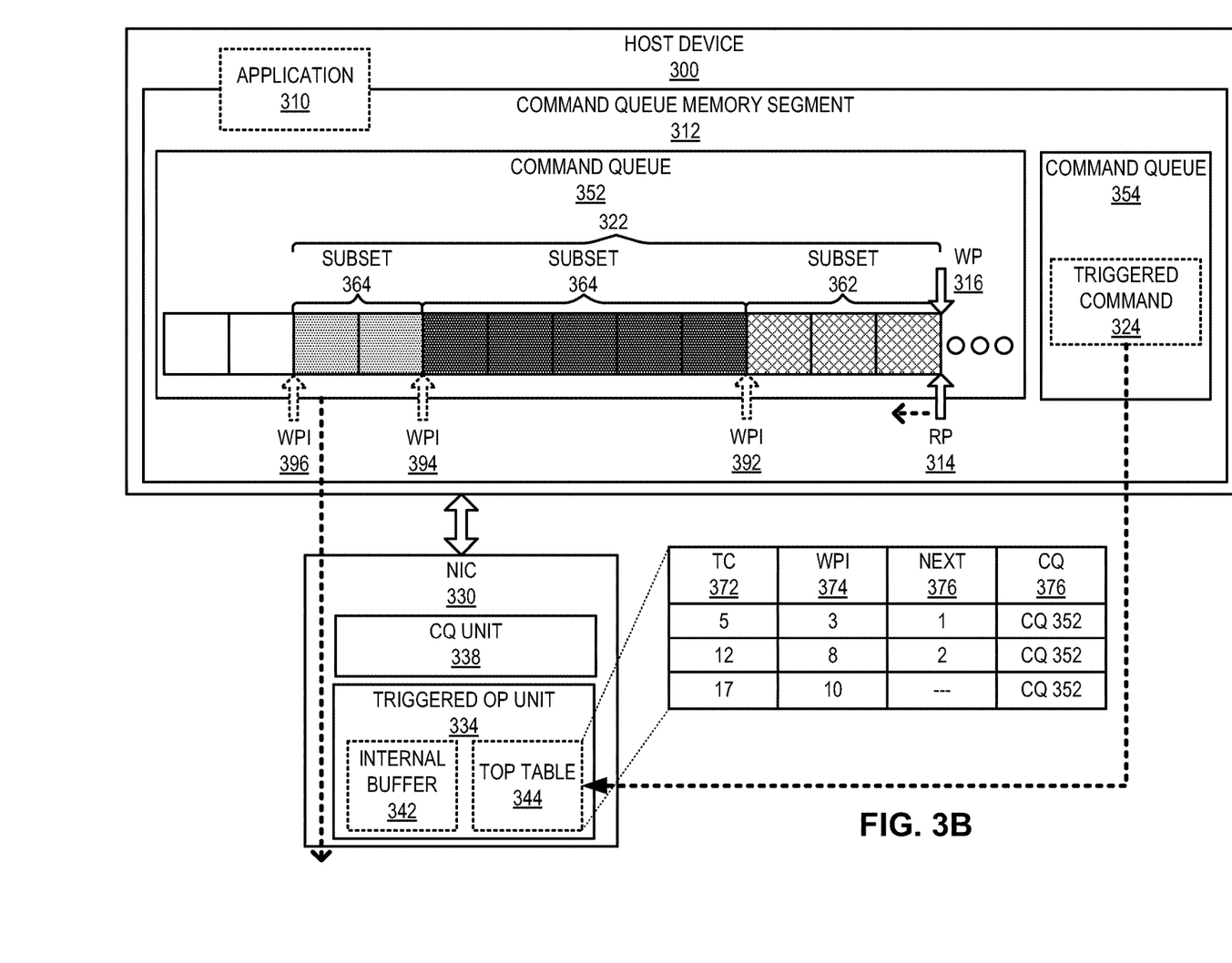
FIG. 3B illustrates an exemplary batch-retrieval process of triggered operations for a NIC, in accordance with an aspect of the present application.

FIG. 3B illustrates an exemplary batch-retrieval process of triggered operations for a NIC, in accordance with an aspect of the present application. Application 310 can continue to set up triggered operations 322 in CQ 352. Instead of updating write pointer 316, application 310 may place the command 324 in CQ 354 in segment 312. Command 324 can include a write pointer indicator 396, which can be a target write pointer value indicating what write pointer 316 of CQ 352 should be upon issuing set of triggered operations 322. TOU 334 can retrieve command 324 from CQ 354 and store the information in command 324 in table 344. The information can include one or more of: a trigger condition 372, a write pointer indicator 374 indicating the end of set of triggered operations 322 in CQ 352 (e.g., the value of write pointer indicator 396), and a CQ identifier 376 (e.g., an identifier of CQ 352).

TOU 354 can then monitor trigger condition 372, which can be a threshold value indicating the completion of other related operations. NIC 330 can maintain a counter corresponding to a respective such threshold value. When the counter reaches the threshold value specified in trigger condition 372 of table 344, TOU 334 can determine that trigger condition 372 has been satisfied. When trigger condition 372 is satisfied, TOU can update write pointer 316 with write pointer indicator 396. TOU 334 can then allow NIC 330 to obtain each triggered operation in set of triggered operations 322 (i.e., each corresponding command) and issue the obtained triggered operation without storing it in buffer 342. Subsequently, a CQ unit 338 of NIC 330 can increment read pointer 314, thereby allowing NIC 330 to obtain the next triggered operation from CQ 352 and issue the obtained triggered operation. TOU 334 and CQ unit 338 can continue this process until read pointer 314 reaches write pointer 316 (e.g., the location indicated by write pointer indicator 396). In this way, NIC 330 can issue set of triggered operations 322 without storing them in internal buffer 342.

In some embodiments, set of triggered operations 322 can include a number of subsets 362, 364, and 366. Each of the subsets can be associated with a corresponding trigger condition (e.g., a threshold value) and a write pointer indicator. The trigger condition for each such subset of triggered operations can be referred to as a trigger sub-condition. These trigger sub-conditions may or may not be the same. This allows set of triggered operations 322 to represent a complex set of triggered operations that have different trigger conditions but the same repeat pattern as a whole. TOU 334 can generate and maintain an entry for each of subsets 362, 364, and 366 in table 344. Under such circumstances, TOP table 344 can also include a next pointer 376, which can indicate whether there is a subsequent subset of triggered operation. If there is a subsequent subset, a value of next pointer 376 can indicate the next entry that stores information associated with the subsequent subset in table 344. If table 344 is implemented as a linked list, the value of next pointer 376 can be a pointer to the next element (or node) of the linked list.

In this example, TOU 334 can monitor the value of trigger condition 372 in the first entry of table 344. When trigger condition 372 for subset 362 is satisfied (e.g., the counter reaches a value of 5), TOU 334 signals NIC 330 to obtain a triggered operation from CQ 352, as indicated by the value of CQ identifier 376 in the corresponding entry of table 344. To do so, TOU 334 can update write pointer 316 with write pointer indicator 392. Accordingly, NIC 330 can obtain the triggered operation indicated by read pointer 314 and issue the triggered operation. CQ unit 338 can then increment read pointer 314, which allows NIC 330 to obtain the next triggered operation indicated by read pointer 314 and issue the triggered operation. TOU 334 can repeat this process until read pointer 314 reaches write pointer 316 (e.g., the location indicated by write pointer indicator 392).

Based on the value of next pointer 376 in the entry, TOU 334 can determine another entry in table 344, indicating the presence of another subset. Accordingly, TOU 334 can monitor the value of trigger condition 372 in the next entry of table 344. In the same way, when trigger condition 372 for subset 364 is satisfied (e.g., the counter reaches a value of 12), TOU 334 can update write pointer 316 with write pointer indicator 394. NIC 330 can then obtain each triggered operation of subset 364 and issue the obtained triggered operation. TOU 334 and CQ unit 338 can repeat this process until read pointer 314 reaches write pointer 316 (e.g., the location indicated by write pointer indicator 394). Based on the value of next pointer 376 in the second entry, TOU 334 can determine the presence of another entry in table 344.

When trigger condition 372 for subset 366 is satisfied (e.g., the counter reaches a value of 17), TOU 334 can update write pointer 316 with write pointer indicator 396. NIC 330 can then obtain each triggered operation of subset 364 and issue the obtained triggered operation. TOU 334 can repeat this process until read pointer 314 reaches write pointer 316 (e.g., the location indicated by write pointer indicator 396). Based on the value of text pointer 376 in the third entry (e.g., a predetermined value, such as NULL), TOU 334 can determine that the entire set of triggered operations 322 has been issued. In this way, TOU 334 can facilitate the efficient processing of triggered operations in NIC 330 without storing the triggered operations in buffer 342.

Figure 3C:
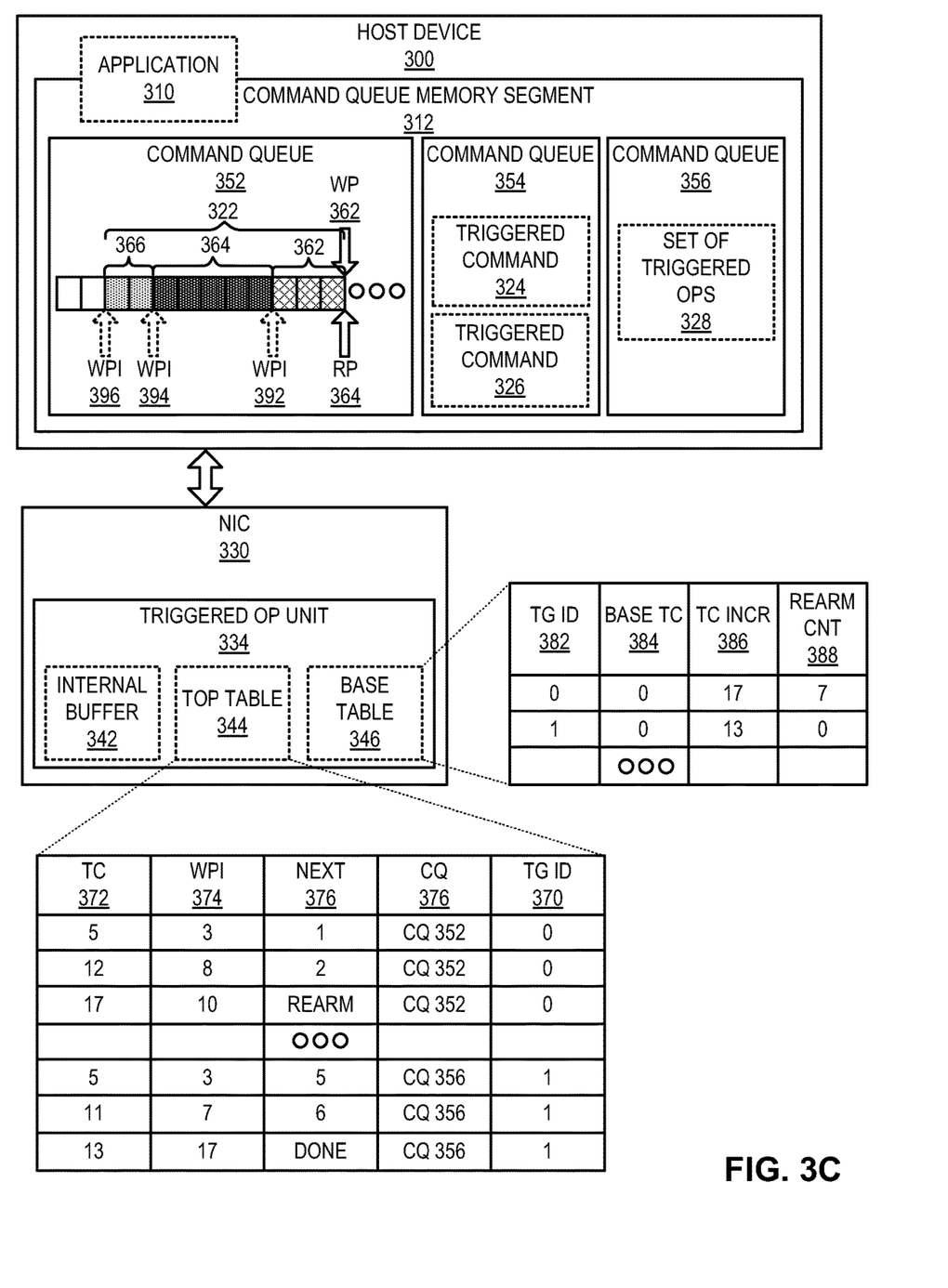
FIG. 3C illustrates an exemplary reset process of batch-retrieval of triggered operations for a NIC, in accordance with an aspect of the present application.

FIG. 3C illustrates an exemplary reset process of batch-retrieval of triggered operations for a NIC, in accordance with an aspect of the present application. Application 310 may individually issue subsets 362, 364, and 366 of triggered operations (i.e., not as part of set of triggered operations 322). Subsets 362, 364, and 366 can then be bundled together based on one or more bundling conditions. Examples of the bundling conditions include, but are not limited to, explicit definition from a user and NIC 330 automatically detecting relevance among subsets 362, 364, and 366. The explicit definition can be based on a user's input to application 310 via an API. On the other hand, NIC 330 may determine the relevance based on similar thresholds for subsets 362, 364, and 366. NIC 330 may determine the relevance because subsets 362, 364, and 366 are directed to a particular sub-operation of application 310. Based on the grouping, set of triggered operations 322 can be referred to as a triggered group or TG. NIC 330 (or application 310) may allocate an identifier for a respective TG. Each subset of the TG can be associated with the same TG identifier.

Consequently, table 344 can include TG identifier 370. For example, subsets 362, 364, and 366 can be associated with TG identifier value of 0. As a result, the value of TG identifier 370 in table 344 for each entry associated with set of triggered operations 322 can be 0. Suppose that application 310 places another set of triggered operations 328 in CQ 356 in CQ memory segment 312. Application 310 can then issue a triggered command 326 that can include a trigger condition and a write pointer. The trigger condition can indicate when to issue set of triggered operations 328, and a write pointer can indicate the end of set of set of triggered operations 328 in CQ 356. TOU 334 can retrieve command 326 from CQ 354 and store the information in command 326 in table 344.

Suppose that set of triggered operations 328 includes three subsets. Accordingly, TOU 334 can generate three corresponding entries in table 344. If set of triggered operations 328 is associated with TG identifier value of 1, the value of TG identifier 370 in table 344 for each entry associated with set of triggered operations 328 can be 1. Furthermore, CQ identifier 376 for each entry associated with set of triggered operations 328 can corresponds to CQ 356. In this way, table 344 may store one or more entries for each set of triggered operations from application 310. The entries for each of the sets can include the same TG identifier. NIC 330 may maintain a separate counter for managing the trigger conditions for each set of triggered operations.

Furthermore, if application 310 reuses set of triggered operations 322 repeatedly, instead of reissuing set of triggered operations 322, application 310 can indicate a number of times set of triggered operations 322 should be repeated. TOU 334 can maintain a mapping of the TG identifier of set of triggered operations 322 (i.e., the value of 0) and a counter indicating the number of times set of triggered operations 322 should be repeated or rearmed. TOU 33 can maintain the mapping in a base table 346. Table 346 may also be implemented as a linked list. For respective TG, table 346 can include a TG identifier 382, a base trigger condition 384, a trigger condition increment 386, and a rearm count 388. If set of triggered operations 322 is to be repeated seven times, these triggered operations should be rearmed seven times. Therefore, the entry for set of triggered operations 322 can include a TG identifier of 0, and a rearm count value of 7.

Resetting (e.g., to a value of 0) the counter for indicating a trigger condition may lead to a race condition. Hence, instead of resetting the counter, NIC 330 may continue to increase the counter value. For example, if a set of triggered operations rely on data from n nodes, the threshold value can be n. When the counter value reaches n, TOU 334 can determine that the trigger condition has been satisfied. NIC 330 can then obtain and issue each operation of the set of the triggered operations. If the triggered operations are to be repeated when the data from the n nodes is received again, subsequent threshold can be 2n. Accordingly, the base trigger condition can be n, and the trigger condition increment can also be n. For set of triggered operation 322, the initial value of the counter is 0. Furthermore, when the threshold value reaches 17, all operation of set of triggered operation 322 are issued. Accordingly, for set of triggered operation 322, the values of base trigger condition 384 and trigger condition increment 386 can be 0 and 17, respectively. For the first and second rearming, the value of base trigger condition 384 can be set to 17 and 34, respectively (i.e., incremented by 17 for each rearming).

When all triggered operations in set of triggered operation 322 are issued, next pointer 376 in the corresponding entry of table 344 can include a "REARM" value. The REARM value can be a predefined value that indicates that the triggered operations should be rearmed, as described in conjunction with FIG. 3B. TOU 334 can then determine the associated TG identifier from TOP table 344. TOU 334 can look up the TG identifier in table 346 and identify the corresponding entry. TOU 334 can determine whether the rearm counter value in the entry has a non-zero positive value. If the counter has a non-zero positive value, TOU 334 can wait for the completion of the issuance of a respective triggered operation of set of triggered operation 322, decrement the counter value, and rearm set of triggered operation 322. The rearming includes resetting the read and write pointers to an initial value (e.g., a value of zero). TOU 334 can also update the value of the base trigger condition by the value of trigger condition increment for the entry.

Suppose that set of triggered operations 328 is not repeated by application 310. Next pointer 376 in the corresponding entry of table 344 can then include a "DONE" value (e.g., a predefined value) distinct from the REARM value. Based on the DONE value, TOU 334 can determine that set of triggered operations 328 is not repeated. Instead of the DONE value, the entry may include the REARM value. TOU 334 can then determine that the corresponding value of rearm count 388 in table 346 is 0. If the DONE value is used, set of triggered operations 328 may not have a corresponding entry in table 346. In this way, NIC 330 can efficiently use the already stored triggered operations in command queue 352, thereby allowing application 310 to avoid repeatedly reissuing the same triggered operations.

Figure 4A:
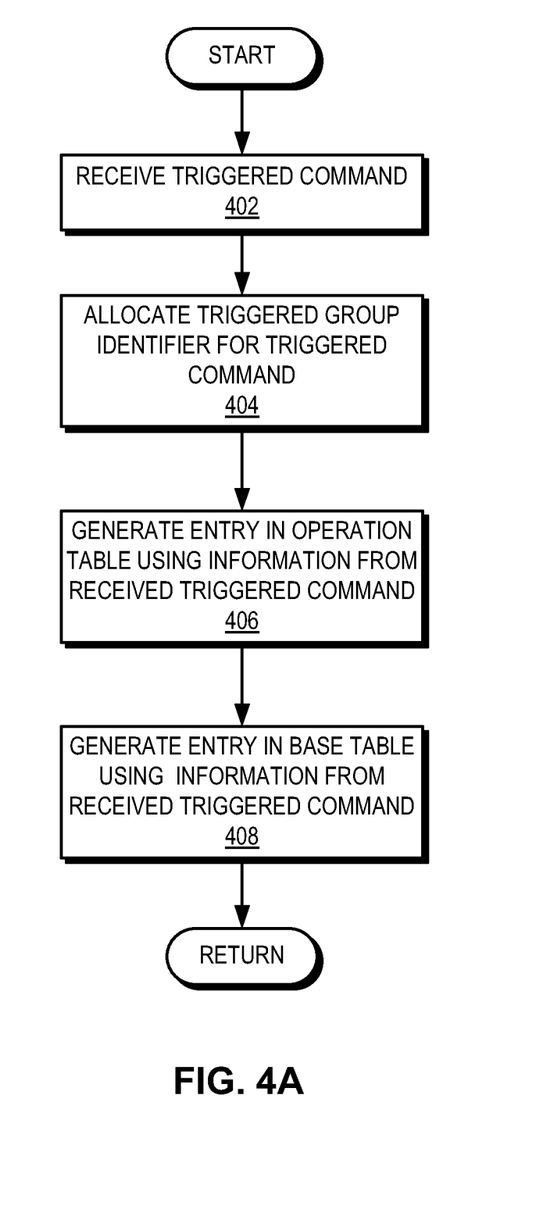
FIG. 4A presents a flowchart illustrating the process of a NIC managing triggered operations from a command queue, in accordance with an aspect of the present application.

FIG. 4A presents a flowchart illustrating the process of a NIC managing triggered operations from a command queue, in accordance with an aspect of the present application. During operation, the NIC can receive a triggered command (operation 402) and allocate a triggered group identifier for the triggered command (operation 404). The NIC can generate an entry in a TO table using information from the received triggered command (operation 406). Similarly, the NIC can generate an entry in a base table using information from the received triggered command (operation 408).

Figure 4B:
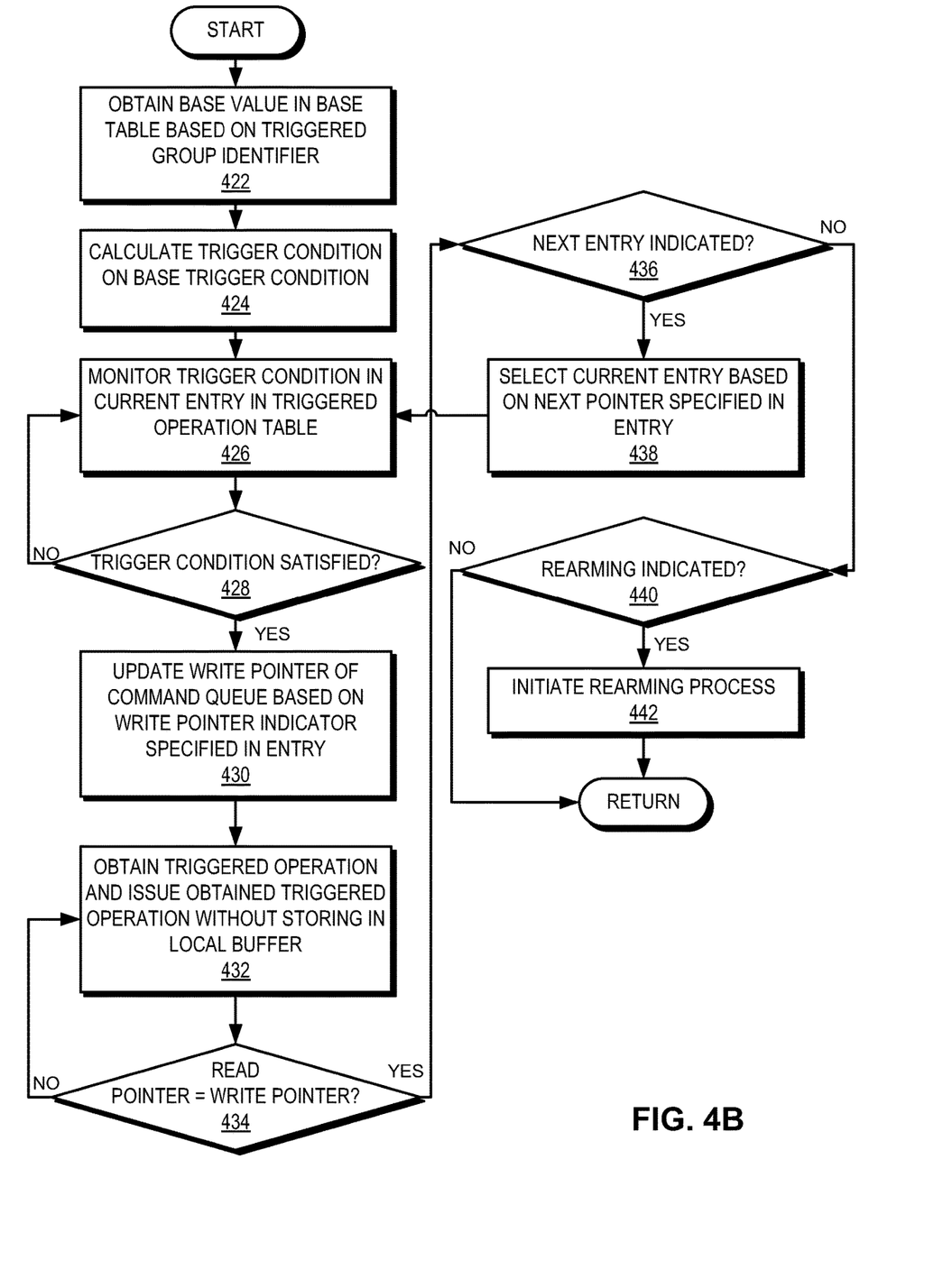
FIG. 4B presents a flowchart illustrating the process of a NIC retrieving and issuing a batch of commands without local buffering, in accordance with an aspect of the present application.

FIG. 4B presents a flowchart illustrating the process of a NIC retrieving and issuing a batch of commands without local buffering, in accordance with an aspect of the present application. During operation, the NIC can obtain a base value in the base table based on the TG identifier (operation 422). The NIC can then calculate the trigger condition based on the base trigger condition (e.g., the threshold value based on the base threshold value) (operation 424). The NIC can monitor the trigger condition in the current entry in the TO table (operation 426) and check whether the trigger condition is satisfied (operation 428). In some embodiments, the trigger condition is a counter value reaching a threshold value.

If the trigger condition is not satisfied, the NIC can continue to monitor the trigger condition in the current entry in the TO table (operation 426). On the other hand, if the trigger condition is satisfied, the NIC can update the write pointer of the command queue based on the write pointer indicator specified in the entry (operation 430). The NIC can then obtain a triggered operation (e.g., when a CQ unit of the NIC moves the read pointer) and issue the obtained triggered operation without storing it in the local buffer (operation 432). The NIC can check whether the read pointer has reached the write pointer (operation 434). If the read pointer has not reached the write pointer, the NIC can continue to obtain the next triggered operation by moving the read pointer and issue the obtained triggered operation without storing in the local buffer (operation 432).

On the other hand, if the read pointer has reached the write pointer, the NIC can determine whether a next entry is indicated by a next pointer in the entry (operation 436). If a next entry is indicated in the entry, the NIC can select the current entry based on the next pointer specified in the entry (operation 438). The NIC can then monitor the trigger condition in the updated current entry in the TO table (operation 426). On the other hand, if a next entry is not indicated, the NIC can determine whether rearming is indicated in the entry (operation 440). If rearming is indicated in the entry, the NIC can initiate the rearming process (operation 442). Otherwise, the NIC has completed issuing the triggered operations.

Figure 4C:
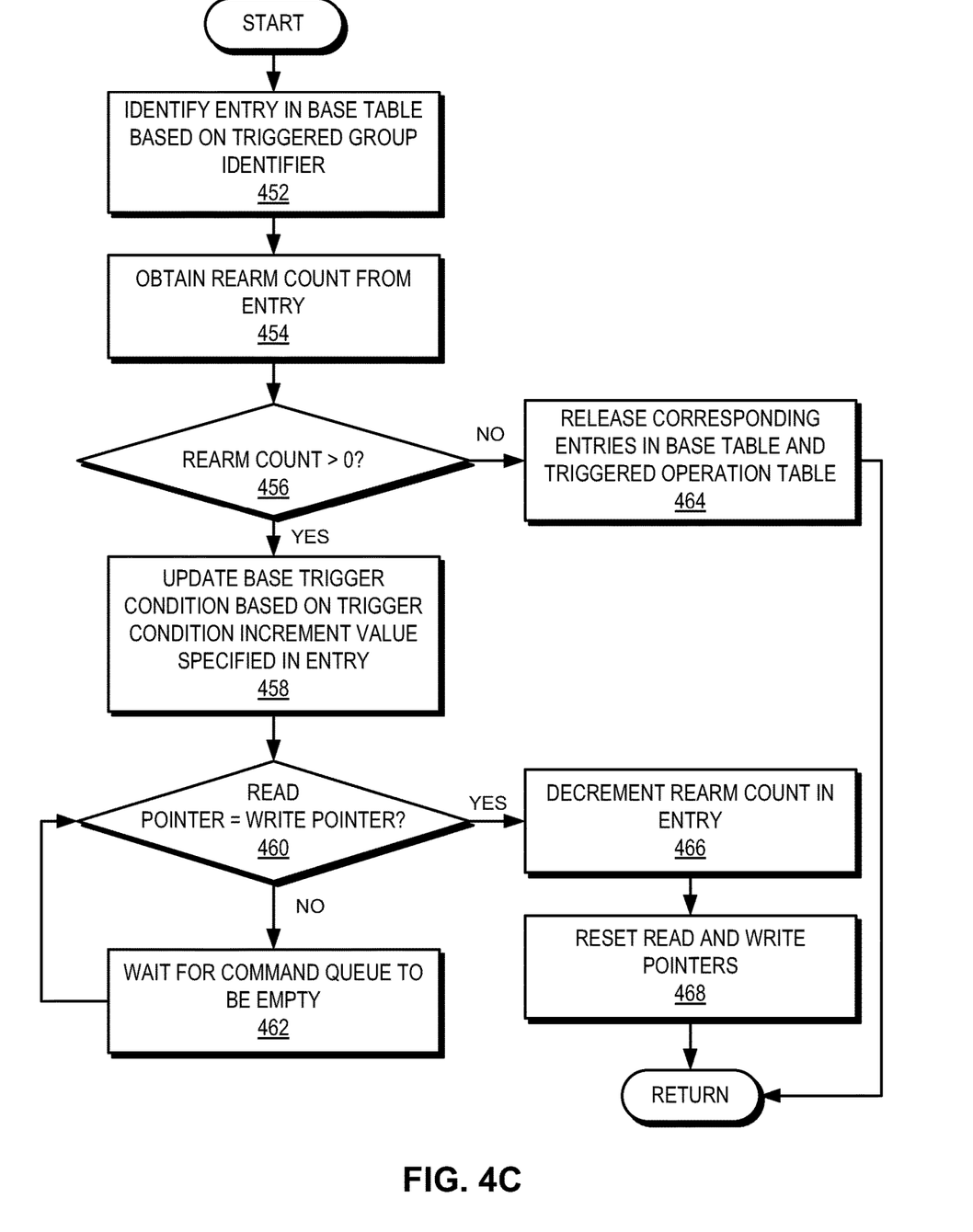
FIG. 4C presents a flowchart illustrating the process of a NIC rearming the batch processing of triggered operations, in accordance with an aspect of the present application.

FIG. 4C presents a flowchart illustrating the process of a NIC rearming the batch processing of triggered operations, in accordance with an aspect of the present application. During operation, the NIC can identify an entry in the based table based on the TG identifier (operation 452) and obtain a rearm count from the entry (operation 454). The NIC can then determine whether the rearm count is greater than zero (operation 456). If the rearm count is not greater than zero (i.e., has become zero), the NIC can release the corresponding entries in the base table and the TO table (operation 464).

However, if the rearm count is greater than zero, the NIC can update the base trigger condition based on the trigger condition increment value specified in the entry (operation 458).

The NIC can check whether the read pointer has reached the write pointer (operation 460). If the read pointer has not reached the write pointer, the NIC can wait for the command queue to be empty (operation 462) and continue to check whether the read pointer has reached the write pointer (operation 460). On the other hand, if the read pointer has reached the write pointer, the NIC can decrement the rearm count in the entry (operation 466) and reset the read and write pointers (e.g., to an initial value, such as a value of 0) (operation 468).

Figure 5:
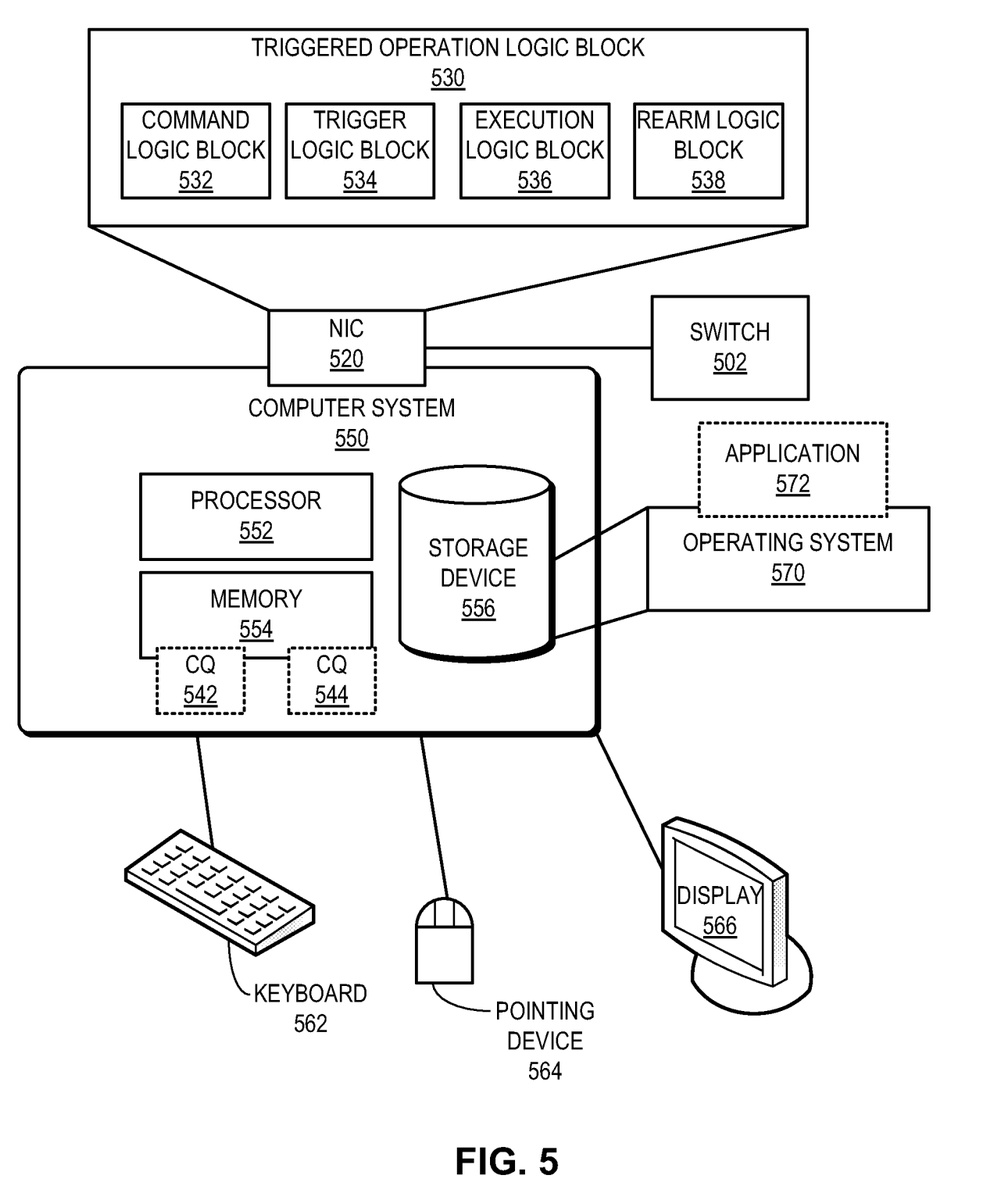
FIG. 5 illustrates an exemplary computer system equipped with a NIC that facilitates dynamic triggered operation management, in accordance with an aspect of the present application.

FIG. 5 illustrates an exemplary computer system equipped with a NIC that facilitates dynamic triggered operation management, in accordance with an aspect of the present application. Computer system 550 can include a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570. Memory device 554 can include CQs 542 and 544. Application 572 can place triggered operations in CQ 542 and triggered command in CQ 544

Computer system 550 can be equipped with a host interface coupling a NIC 520 that facilitates efficient command management. NIC 520 can provide one or more HNIs to computer system 550. NIC 520 can be coupled to a switch 502 via one of the HNIs. NIC 520 can include a triggered operation logic block 530, as described in conjunction with FIGS. 3A, 3B, and 3C. Triggered operation logic block 530 can include a command logic block 532, a trigger logic block 534, an execution logic block 536, and a reset logic block 538. Command logic block 532 can retrieve triggered commands from CQ 544 and populate corresponding entries in the local TO table and base table. Command logic block 532 can also group relevant triggered operations into a TG based on one or more bundling conditions and allocate a corresponding TG identifier.

Trigger logic block 534 can determine whether a trigger condition for a set (or subset) of triggered operations in CQ 542 has been satisfied. Execution logic block 536 can obtain a respective triggered operation from the set of triggered operations and issue the triggered operation without storing it in a local buffer. Execution logic block 536 can also determine whether the set of triggered operations should be rearmed. Rearm logic block 538 can rearm the set of triggered operations by updating the base trigger condition, decrementing the rearm counter, and resetting the read and write pointers of CQ 542. If the set of triggered operations are not be rearmed, rearm logic block 538 may release the entries associated with the set of triggered operations.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating efficient command management in a network interface controller (NIC), the method comprising:
   determining, by the NIC, a trigger condition and a location in a command queue for a set of commands corresponding to the trigger condition, wherein the command queue is external to the NIC, and wherein the location corresponds to an end of the set of commands in the command queue;
   determining, by the NIC, whether the trigger condition has been satisfied; and
   in response to the trigger condition being satisfied, fetching a respective command of the set of commands from the command queue and issuing the command from the NIC until the location is reached, thereby bypassing locally storing the set of commands prior to the trigger condition being satisfied.

2. The method of claim 1, further comprising:
   obtaining a triggered command indicating the trigger condition and the location in the command queue; and
   generating, in a data structure, an entry comprising the trigger condition and the location.

3. The method of claim 2, wherein obtaining the triggered command further comprises:
   determining presence of the triggered command in a second command queue external to the NIC; and
   retrieving the triggered command from the second command queue.

4. The method of claim 1, wherein the set of commands includes a plurality of subsets of commands, wherein a respective subset of commands is associated with a trigger sub-condition for the subset of commands and a location indicating an end of the subset of commands in the command queue; and
   wherein the method further comprises generating, in a data structure, an entry comprising the trigger sub-condition and the location for the subset of commands.

5. The method of claim 4, wherein the entry for the subset of commands further includes a next-entry indicator indicating that a second entry for a second subset of commands is present in the data structure; and wherein the method further comprises
in response to the trigger sub-condition being satisfied, issuing the subset of commands; and
determining whether a second trigger sub-condition for the second subset of commands has been satisfied.

6. The method of claim 4, further comprising:
grouping the plurality of subsets of commands into a triggered operation group based on one or more bundling conditions; and
allocating an identifier to the triggered operation group, wherein a respective subset of commands is associated with the identifier.

7. The method of claim 1, wherein the location is a target write pointer value of the command queue;
wherein fetching the respective command from the command queue further comprises:
updating a write pointer of the command queue with the target write pointer value; and
moving a read pointer of the command queue until reaching the write pointer.

8. The method of claim 7, further comprising:
determining whether to rearm the set of commands based on a rearm counter; and
rearming the set of commands by:
resetting the read and write pointers; and
decrementing the rearm counter.

9. The method of claim 7, wherein rearming the set of commands further comprises deriving the trigger condition from a base condition.

10. The method of claim 1, wherein the trigger condition corresponds to a threshold value;
wherein determining whether the trigger condition has been satisfied further comprises determining whether a counter value has reached the threshold value.

11. A network interface controller (NIC), comprising:
a host interface coupling a host device; and
control circuitry facilitating a trigger logic block and an execution logic block;
wherein the trigger logic block is to:
determine a trigger condition and a location in a command queue for a set of commands corresponding to the trigger condition, wherein the command queue is in the memory device of the host device, and wherein the location corresponds to an end of the set of commands in the command queue; and
determine whether the trigger condition has been satisfied; and
wherein the execution logic block is to, in response to the trigger condition being satisfied, fetch a respective command of the set of commands from the command queue and issuing the command from the NIC until the location is reached, thereby bypassing locally storing the set of commands prior to the trigger condition being satisfied.

12. The network interface controller of claim 11, wherein the control circuitry further facilitates a command logic block, wherein the command logic block is to:
obtain a triggered command indicating the trigger condition and the location in the command queue; and
generate, in a data structure, an entry comprising the trigger condition and the location.

13. The network interface controller of claim 12, wherein the command logic block is to obtain the triggered command by:
determining presence of the triggered command in a second command queue external to the NIC; and
retrieving the triggered command from the second command queue.

14. The network interface controller of claim 11, wherein the set of commands includes a plurality of subsets of commands, wherein a respective subset of commands is associated with a trigger sub-condition for the subset of commands and a location indicating an end of the subset of commands in the command queue; and
wherein the wherein the control circuitry further facilitates a command logic block, wherein the command logic block is to generate, in a data structure, an entry comprising the trigger sub-condition and the location for the subset of commands.

15. The network interface controller of claim 14, wherein the entry for the subset of commands further includes a next-entry indicator indicating a second entry for a second subset of commands that is present in the data structure;
wherein the execution logic block is further to, in response to the trigger sub-condition being satisfied, issue the subset of commands; and
wherein the trigger logic block is further to determine whether a second trigger sub-condition for the second subset of commands has been satisfied.

16. The network interface controller of claim 14, wherein the command logic block is further to:
group the plurality of subsets of commands into a triggered operation group based on one or more bundling conditions; and
allocate an identifier to the triggered operation group, wherein a respective subset of commands is associated with the identifier.

17. The network interface controller of claim 11, wherein the location is a target write pointer value of the command queue;
wherein the execution logic block is to fetch the respective command from the command queue by:
updating a write pointer of the command queue with the target write pointer value; and
moving a read pointer of the command queue until reaching the write pointer.

18. The network interface controller of claim 17, wherein the control circuitry further comprising facilitates a rearm logic block, wherein the rearm logic block is to:
determine whether to rearm the set of commands based on a rearm counter; and
rearm the set of commands by:
resetting the read and write pointers; and
decrementing the rearm counter.

19. The network interface controller of claim 17, wherein the rearm logic block is to rearm the set of commands by deriving the trigger condition from a base condition.

20. The network interface controller of claim 11, wherein the trigger condition corresponds to a threshold value;
wherein the trigger logic block is to determine whether the trigger condition has been satisfied by determining whether a counter value has reached the threshold value.

* * * * *